United States Patent [19]

Bly

[11] Patent Number: 4,481,024
[45] Date of Patent: Nov. 6, 1984

[54] HEAT RECOVERY SYSTEM FOR GLASS TANK FURNACES

[75] Inventor: Lloyd G. Bly, Roselle, Ill.

[73] Assignee: M. H. Detrick Company, Itasca, Ill.

[21] Appl. No.: 436,183

[22] Filed: Oct. 22, 1982

[51] Int. Cl.³ ............................................. C03B 5/235
[52] U.S. Cl. ........................................ 65/337; 65/136; 65/137; 65/346; 65/356
[58] Field of Search ................. 65/337, 136, 137, 356, 65/346

[56] References Cited

U.S. PATENT DOCUMENTS

| | | | |
|---|---|---|---|
| 1,923,942 | 8/1933 | Lufkin | 65/346 X |
| 1,991,331 | 2/1935 | Morton | 65/356 X |
| 1,999,762 | 4/1935 | Howard | 65/136 |
| 3,837,832 | 9/1974 | Pecoraro et al. | 65/337 X |
| 4,294,603 | 10/1981 | Winzer | 65/337 X |

Primary Examiner—Arthur Kellogg
Attorney, Agent, or Firm—Emrich & Dithmar

[57] ABSTRACT

A conventional glass tank furnace used in the manufacture of glass is provided with a system for recovering heat which inevitably escapes from the furnace roof or crown above the melting and refining tanks of the furnace. A heat recovery plenum means is mounted on top of the furnace roof or crown, and an air blower supplies cool air to the plenum means through a first duct means. The cool air directed to the plenum means cools the furnace crown and in the case of a suspended flat arch crown, the supporting steel work. The cool air in the plenum means is heated by heat escaping from the furnace crown, and thereafter is directed through second duct means to a main combustion air blower where the heated air from the plenum means is mixed with primary combustion air and directed to the furnace and to the furnace burners. Control means are provided to maintain the air in the plenum means at positive pressure so as to prevent air in the furnace from escaping through the furnace crown. The recovery and utilization of the heat otherwise lost through the crown improves furnace efficiency and thus reduces the amount of fuel used in the glass manufacturing process. Also, the life of the furnace crown is extended, thus making it possible to design furnace volumes initially so as to minimize the amount of fuel used and to avoid overheating the refractory in the refractory enclosure.

7 Claims, 3 Drawing Figures

HEAT RECOVERY SYSTEM FOR GLASS TANK FURNACES

BACKGROUND OF THE INVENTION

This invention relates to glass tank furnaces used in the manufacture of glass, and more particularly to a cooperating auxiliary system that recovers heat conducted through the furnace roof or "crown" and uses the recovered heat for preheating some of the combustion air.

Conventional glass tank furnaces tend to operate inefficiently for a number of reasons. Like most furnaces, glass tank furnaces lose heat to the surrounding atmosphere, which heat either should not be lost, or should be recovered in order to improve furnace efficiency. Such heat loss tends to increase as the furnace ages, thereby making it impossible in the first instance to design the furnace for maximum efficiency over the furnace life.

In conventional glass tank furnaces the roof or crown generally is one or the other of two types. One type is the more modern suspended flat arch roof or crown while the other type is the older sprung arch roof or crown. The present invention, as will be seen, improves the efficiency of the glass tank furnaces having both types of roofs or crowns, and also cooperates to prolong the life of furnaces having both types of crowns.

SUMMARY OF THE INVENTION

One object of the invention, therefore, is to provide a heat recovery system for a conventional glass tank furnace that will increase the efficiency of furnace operation.

Another object of the invention is to provide a heat recovery system that due to the improved original design of the furnace will contribute to prolonged furnace life.

As is well known, a conventional glass tank furnace has a regenerator for heating combustion air for associated burners, a melting tank for raw materials, a refining tank and a refractory enclosure, including a roof or crown, for the burners, melting tank and refining tank.

In summary, the present invention provides a heat recovery system for such a conventional glass tank furnace which comprises a heat recovery plenum means mounted on top of the furnace crown, an air blower having an air inlet and an outlet, a first duct means between the blower outlet and the plenum means for directing air into the plenum means where the air is heated by heat escaping from the furnace crown, and a second duct means between the plenum means and the furnace for directing the heated air to the furnace for use as combustion air for the burners, whereby the efficiency of the furnace is enhanced significantly.

The aforesaid heat recovery system generally includes an air volume adjustment damper means in the second duct means whereby the pressure and velocity of air in the plenum means may be controlled to maximize the enhanced furnace efficiency provided by the system and to maximize the life expectancy of the furnace crown and thus the life expectancy of the furnace itself.

In more detailed aspect, the plenum means of the heat recovery system is provided with exterior heat insulating material, while insulating material on the exterior of the conventional roof or crown may be eliminated, thereby allowing the refractory members in the roof or crown to be inspected from time to time through spaced viewing ports extending through the plenum means and the insulating material thereon.

In the heat recovery system of the invention the air delivered by the blower to the plenum means is cool air, whereby the depth of heat penetration into the furnace crown is thermally maintained closer to the hot face of the crown and the life of the crown is prolonged.

The pressure of the air in the plenum means desirably is greater than the air pressure in the furnace enclosure, whereby escape of exhaust gasses through the furnace crown to the plenum means is precluded, and the life of the furnace crown is prolonged.

In more detailed aspect, the plenum means of the heat recovery system of the invention may include separate plenums mounted respectively on the crowns of the melting and refining tanks, the first and second duct means of the heat recovery system being connected to both plenums.

The air in the second duct means which has been heated by recovered heat is mixed with additional, primary combustion air prior to entering the furnace.

The benefits of the heat recovery system of the invention enable more efficient initial design of the furnace volumes, including combustion chambers, above the melting and refining tanks, render crown insulation unnecessary, and reduce the fuel requirements of the burners.

The invention consists of certain novel features and combination of parts hereinafter described, illustrated in the accompanying drawings and particularly pointed out in the appended claims, it being understood that various changes in the details may be made without departing from the spirit or sacrificing any of the advantages of the present invention.

DETAILED DESCRIPTION

Figure 1:
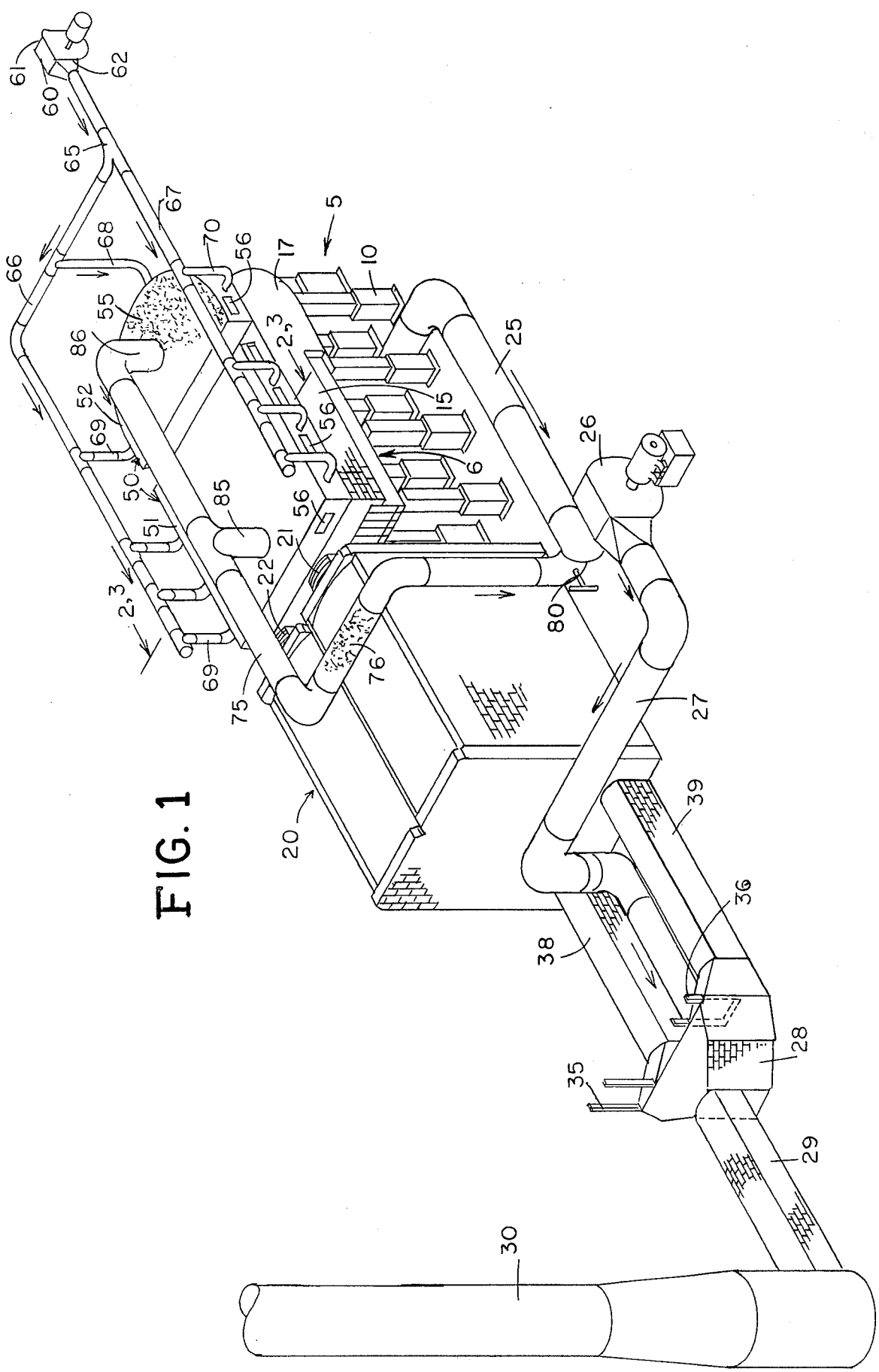
FIG. 1 is a perspective view of a conventional glass tank furnace to which the heat recovery system of the present invention has been applied.

Referring to the drawings, a typical glass tank furnace to which the present invention is applied first will be described. The furnace illustrated in FIG. 1 is generally designated 5.

Figure 2:
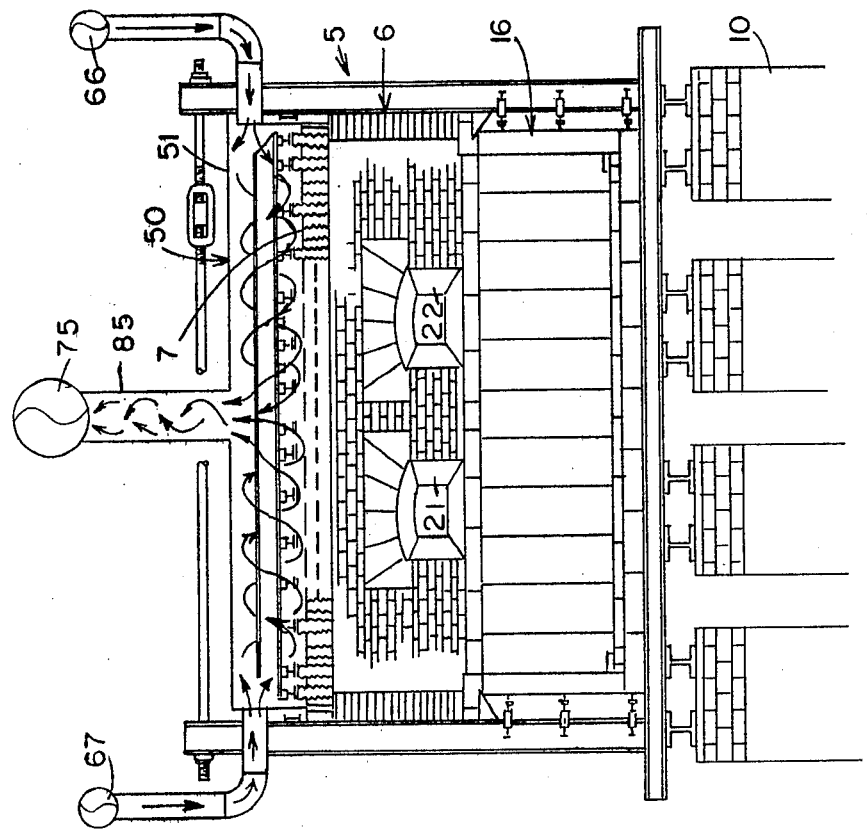
FIG. 2 is a fragmentary sectional view on line 2,3—2,3 of FIG. 1, the view showing the invention applied to a glass tank furnace having a suspended flat arch roof or crown.
Figure 3:
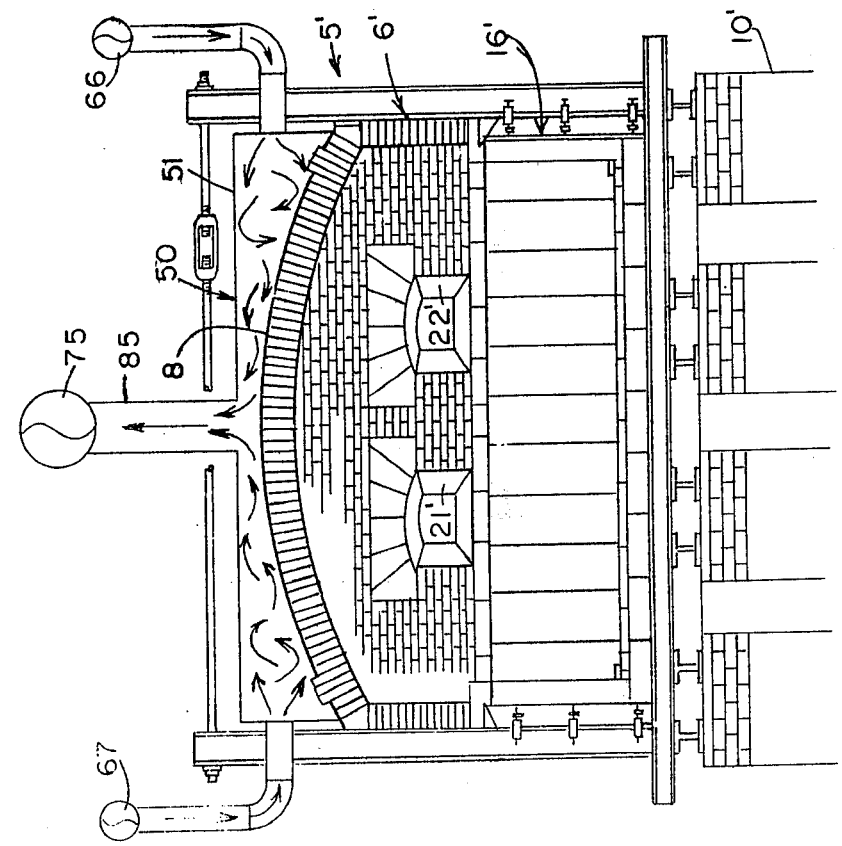
FIG. 3 is a sectional view on line 2,3—2,3 of FIG. 1 showing the invention applied to a glass tank furnace having a sprung arch roof or crown.

Furnace 5 includes a refractory enclosure 6, best shown in FIGS. 2 and 3. In FIG. 2, the furnace and refractory enclosure are numbered 5 and 6, respectively, while in FIG. 3, the furnace and refractory enclosure are numbered 5' and 6' respectively. In FIG. 2, the suspended flat arch roof or crown is designated 7, while in FIG. 3, the sprung arch roof or crown is designated 8. In other respects, the glass tank furnaces of FIGS. 2 and 3 are essentially the same.

Refractory enclosure 6 in FIGS. 1 and 2 and refractory enclosure 6' in FIG. 3 are supported in elevated position by a plurality of pillars 10 and 10' respectively, which rest on a suitable base (not shown).

Refractory enclosure 6 portion 15 (FIG. 1) houses a conventional raw material melting tank 16 (FIG. 2) and 16' (FIG. 3), while refractory enclosure 6 portion 17 (FIG. 1) houses a conventional refining tank (not shown).

As shown, a conventional regenerator 20 is located adjacent to the portion of the refractory enclosures 6 and 6' containing melting tank 16 (FIG. 2) and 16' (FIG. 3), and is connected to the refractory enclosure 6 by port necks 21 and 22 (FIGS. 1 and 2) and port necks 21' and 22' (FIG. 3). Burners (not shown) are located in effective relation within the port necks. The burners receive heated combustion air and fuel such as natural gas or oil in conventional manner.

The major portion of combustion air directed to regenerator 20 (FIG. 1) enters the regenerator from below furnace 5 through combustion air inlet duct 25, combustion air blower 26, combustion air supply duct 27 and conventional furnace reversal equipment 28, the latter being connected by flue 29 to stack 30.

Reversal equipment 28 includes a pair of reversal dampers 35 and 36 which communicate in conventional manner with regenerator 20 by means of flues 38 and 39, respectively.

Having thus described those parts of a conventional glass tank furnace 5 which cooperate with the present invention, the heat recovery system of the invention now will be described.

Referring first to FIG. 1, a heat recovery plenum means, generally designated 50, is mounted on top of the furnace crown 7 (FIG. 2) or 8 (FIG. 3). As shown in FIG. 1, plenum means 50 comprises a separate plenum 51 mounted on the furnace crown over the melting tank and a separate plenum 52 mounted on the crown above the refining tank. Plenum means 50 or the separate plenums 51, 52 is made of sheet metal and covers substantially the entire furnace crown.

The exterior of plenum means 50 is covered with insulation material diagrammatically indicated by 55. Use of insulation material 55 on the exterior of plenum means 50 makes it unnecessary to use insulation material on the exterior or crowns 7 (FIG. 2) and 8 (FIG. 3). The elimination of insulation material from the furnace crown is desirable from the standpoint of avoiding over-insulating a crown, resulting in hot face silicious run-off or actual creep of the crown refractory by exceeding the temperature limit of the refractory. The elimination of crown insulation also permits direct observation of the condition of the crown. Such observation takes place through viewing ports 56 disposed in spaced relation in plenum means 50.

The heat recovery system of the invention also includes an air blower 60 having an air inlet 61 for exterior fresh air and an air outlet 62.

A first duct means 65 extends from blower outlet 62 to plenum means 50 for directing cool air into plenum means 50 where the air is heated by heat escaping from the furnace crown. As shown, first duct means 65 divides into two branches, one branch 66 communicating with an end and one side of plenum means 50, and the other branch 67 communicating with the other side of plenum means 50. A duct 68 connects branch duct 66 with an end of plenum means 50, while ducts 69 connect branch duct 66 with one side of plenum means 50. Ducts 70 connect branch duct 67 with the other side of plenum means 50, thereby insuring the requisite supply of cool air from blower 60 to plenum means 50.

Such cool air, in addition to performing its primary function of recovering heat which escapes from the furnace crown, also cools the furnace crown, and, in the case of the suspended flat arch crown 7 (FIG. 2), also cools the supporting steel work. This cooling, of course, tends to prolong the life of the crowns 7 (FIG. 2) and 8 (FIG. 3).

The suspended flat arch crown makes it possible initially to design the volumes or spaces above the melting and refining tanks so as to eliminate unnecessary furnace volumes over the tanks and thus eliminate the excess heat required to maintain the glass baths at desired temperature. This will enable the heating flames to effectively transfer the thermal energy more directly to the glass batch materials, increasing heat transfer to this material and consequently increasing operating efficiency.

A second duct means 75 extends between plenum means 50 and the primary combustion air system (FIG. 1) previously described which extends to regenerator 20. Second duct means of course, conveys the fresh exterior air heated in plenum means 50 to the primary combustion air system. Accordingly, the exterior of second duct means 75 is covered with insulation material diagrammatically indicated at 76. The heated air conveyed by second duct means 75 eventually is heated further in regenerator 20 along with the fresh exterior air conveyed to regenerator 20 in the main combustion air system.

Second duct means 75 includes an air volume adjustment damper means 80 whereby the pressure and velocity of air in plenum means 50 may be controlled to maximize the enhanced furnace efficiency provided by the heat recovery system and to maximize the life expectancy of the furnace crown. Adjustment of blower 60 may cooperate with damper means 80 in controlling the pressure and velocity of air in plenum means 50.

Damper means 80 and blower 60 are subject to adjustment so that the pressure of the air in plenum means 50 is greater than the air pressure in the furnace enclosure, whereby escape of exhaust gases through furnace crowns 7 (FIG. 2) and 8 (FIG. 3) to plenum means 50 is substantially prevented and the life of the furnace crown is prolonged. As previously mentioned, an extended life of the furnace crown maximizes the advantages to be gained through initial optimum design of volumes above the melting and refining tanks, thereby contributing to improved furnace efficiency over an extended life.

The heated air in second duct means 75 derived from plenum means 50 enters the inlet of main combustion air blower 26 where it is mixed with the primary combustion air and delivered to regenerator 20 through duct 27 the reversal dampers 35 and 36 and flues 38 and 39. The mixed combustion air from the two sources further is heated in regenerator 20 and delivered to the burners (not shown) through port necks 21 and 22.

As shown in FIG. 1 and previously mentioned, plenum means 50 desirably includes separate plenums 51 and 52 mounted respectively on the crowns of the melting and refining tanks. When separate plenums are used, first duct means 65 and second duct means 75 both are connected to both plenums 51 and 52. Second duct means 75 is connected to plenums 51 and 52 by short ducts 85 and 86, respectively.

From the above description it is believed that the construction and advantages of the present invention will be readily apparent to those skilled in the art. Various changes in detail may be made without departing from the spirit or losing the advantages of the invention.

Having thus described the invention, what is claimed as new and desired to be secured by Letters Patent is:

1. In a glass tank furnace having burners, a melting tank, a refining tank and a refractory enclosure, including a crown, for the burners, melting tank and refining tank, the combination therewith of a heat recovery system, comprising: a heat recovery plenum means mounted on top of the furnace crown; an air blower having an air inlet for exterior fresh air and an outlet; first duct means between said blower outlet and said plenum means for directing fresh air into said plenum means where the air is heated by heat escaping from the furnace crown; second duct means between said plenum means and the furnace for directing heated air to the burners for use as combustion air, whereby the efficiency of the furnace is enhanced significantly, the heated air from said second duct means being mixed with additional combustion air prior to entering the furnace.

2. The heat recovery system of claim 1 with the addition of an air volume adjustment damper means in said second duct means whereby the pressure and velocity of air in said plenum means may be controlled to maximize the enhanced furnace efficiency provided by the system and to maximize the life expectancy of the furnace crown.

3. The heat recovery system of claim 1 with the addition of heat insulating material on the exterior of said plenum means and said second duct means.

4. The heat recovery system of claim 1 wherein the air delivered by said blower to said plenum means is cool air, whereby the furnace crown is cooled and the life thereof prolonged.

5. The heat recovery system of claim 1 wherein the pressure of the air in said plenum means is greater than the air pressure in the furnace enclosure, whereby escape of exhaust gases through the furnace crown to said plenum means is precluded and the life of said furnace crown is prolonged.

6. The heat recovery system of claim 1 wherein the benefits thereof enable more efficient design of the furnace volumes, including combustion chambers, above the melting and refining tanks, render crown insulation unnecessary and reduce the fuel requirement of the burners.

7. In a glass tank furnace having a source of primary combustion air, a regenerator for heating combustion air, an adjacent plurality of burners, a glass melting rank adjacent the burners, a glass refining tank adjacent the melting tank and a refractory enclosure, including a crown, for the burners, melting tank and refining tank, the combination therewith of a heat recovery system, comprising:

a heat recovery plenum means mounted on top of the furnace crown;

an air blower having a cool air inlet for exterior fresh air and an outlet;

first duct means between said blower outlet and said plenum means for directing cool air at positive pressure into said plenum means where the air is heated by heat escaping from the furnace crown;

second duct means extending from said plenum means for directing heated air to mix with the primary combustion air prior to directing the air mixture to the regenerator for further heating before use thereof as combustion air for the burners adjacent the melting tank, whereby the efficiency of the furnace is enhanced significantly and the furnace crown is subject to cooling air for extended life.

* * * * *

UNITED STATES PATENT AND TRADEMARK OFFICE
CERTIFICATE OF CORRECTION

PATENT NO. : 4,481,024
DATED : November 6, 1984
INVENTOR(S) : Lloyd G. Bly

It is certified that error appears in the above—identified patent and that said Letters Patent are hereby corrected as shown below:

Claim 7, column 6, line 13, "rank" should be --tank--.

Signed and Sealed this

Twenty-sixth Day of March 1985

[SEAL]

Attest:

DONALD J. QUIGG

Attesting Officer     Acting Commissioner of Patents and Trademarks